United States Patent

[11] 3,578,111

| [72] | Inventor | Harold J. Miller<br>Durand, Mich. |
|---|---|---|
| [21] | Appl. No. | 768,804 |
| [22] | Filed | Oct. 18, 1968 |
| [45] | Patented | May 11, 1971 |
| [73] | Assignee | Simplicity Engineering Company<br>Durand, Mich. |

[54] MULTIPLE BEARING RECIRCULATING LUBRICATION SYSTEM
12 Claims, 2 Drawing Figs.

[52] U.S. Cl. .................................................... 184/6,
 277/92
[51] Int. Cl. .................................................... F01m 1/12
[50] Field of Search ........................................ 184/6 (N),
 6; 308/(Inquired); 74/(Inquired); 277/92; 253/39
 (A); 123/196

[56] References Cited
UNITED STATES PATENTS

| 3,359,952 | 12/1967 | Jones et al. ................... | 123/196X |
| 3,096,850 | 7/1963 | Rosenquist ................... | 184/6 |
| 3,201,134 | 8/1965 | Hayatian ...................... | 277/92 |
| 3,216,513 | 11/1965 | Robbins et al. .............. | 277/92X |
| 3,403,916 | 10/1968 | Durham et al. .............. | 277/92 |

*Primary Examiner*—Manuel A. Antonakas
*Attorney*—Learman, Learman & McCulloch

ABSTRACT: A system for lubricating two or more bearing structures which are eccentrically mounted on a common shaft. The system is comprised of structure which enables a fluid lubricant and coolant to be continuously circulated therethrough.

INVENTOR
HAROLD J. MILLER
BY: *His Attorneys,*
*Learman, Learman & McCulloch*

INVENTOR
HAROLD J. MILLER
BY: His Attorneys,
Learman, Learman & McCulloch

MULTIPLE BEARING RECIRCULATING LUBRICATION SYSTEM

BACKGROUND OF THE INVENTION

In the prior-art structure wherein two or more bearings were eccentrically mounted on a shaft, it was necessary to employ labyrinth seals to protect the bearings from dirt and other abrasive contaminant materials and to properly retain the lubricant. Grease-type lubricants were the only type which could effectively be used in these structures since grease was the only lubricant having enough viscosity to properly maintain a seal between the two relatively movable portions of the seals.

The present invention provides an improved structure employing positive type seals, enabling the lubrication of eccentrically mounted bearings for excluding dirt from the bearings surfaces and retaining lubricating fluids therein and simultaneously permitting the lubricating fluid to flow from one bearing to another along the outer portion of the common shaft, and on the inner sides of the seals.

It is an object of the present invention to produce a structure which eliminates the necessity of labyrinth seals for retaining the grease-type lubricants adjacent the bearing surfaces of a series arrangement of eccentrically mounted bearing units.

Another object of the invention is to produce a structure for a series arrangement of eccentrically mounted bearing units employing a fluid lubricant which is continuously circulated through the bearing.

A further object of the invention is to provide a construction of the character described which may be used in various machinery such as crushers, screens, conveyors, feeders, shake outs and jigging tables.

BRIEF DESCRIPTION OF THE DRAWINGS

Other objects and advantages of the invention will become readily apparent to those skilled in the art from reading the following detailed description of a preferred embodiment of the invention when considered in the light of the accompanying drawings, in which.

DESCRIPTION OF PREFERRED EMBODIMENT

Figure 1:
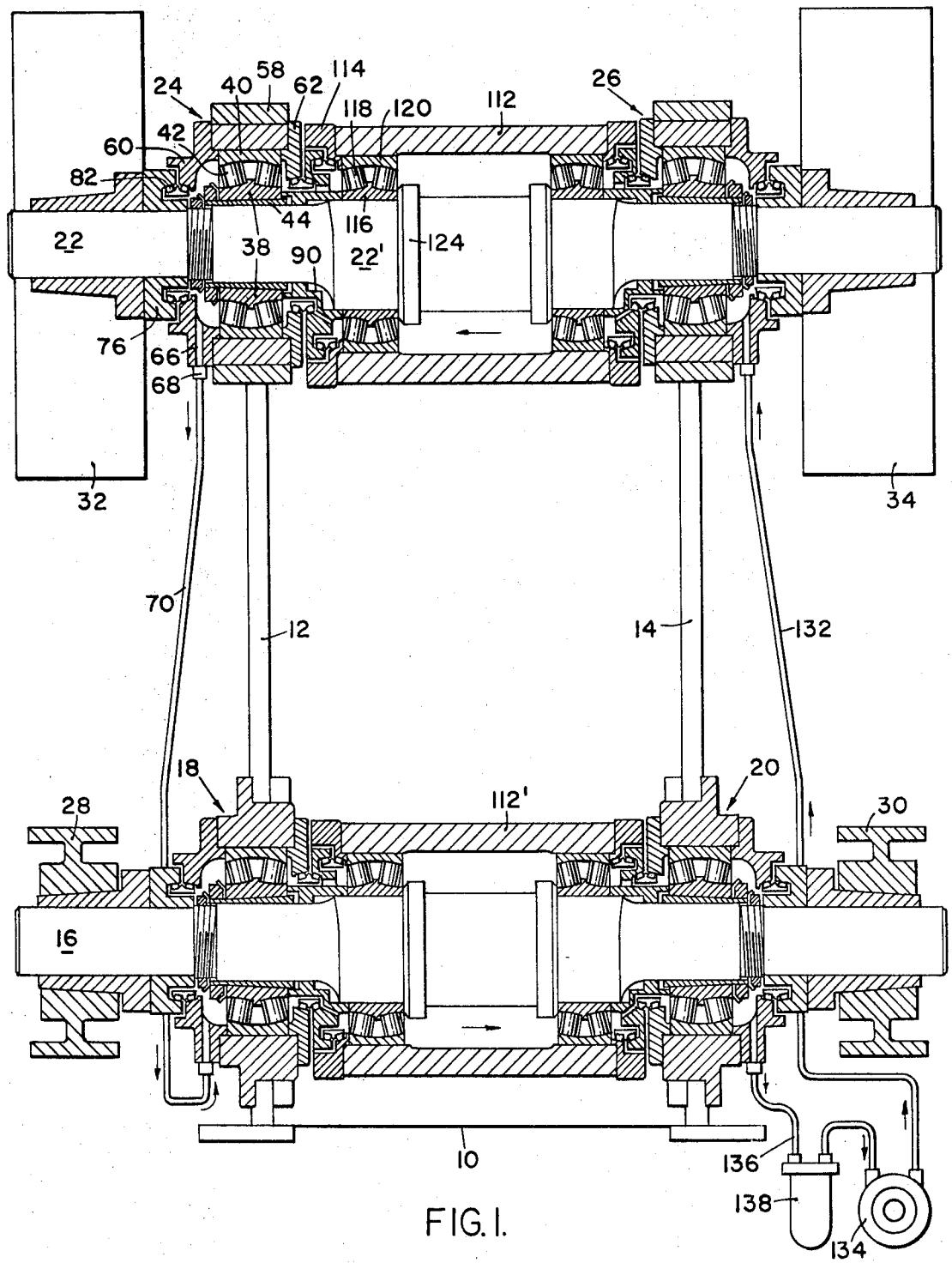
FIG. 1 is an elevational sectional view of a bearing-lubricating system incorporating the principles of the present invention.

Referring to FIG. 1, there is shown a system which could be employed in a vibratory mechanism in machinery used for crushing hard and friable materials, such as ore, rock, coal and the like, of the type illustrated in U.S. Pat. No. 2,605,051 entitled "ROCK CRUSHER," N.H. Bogie, for example. The machine includes a main base frame 10 which typically rests upon a load-supporting floor or platform. Extending vertically upwardly from the base frame 10 is a pair of spaced-apart frame members 12 and 14. A lower shaft 16 is mounted for rotation within bearing units 18 and 20 disposed in the walls 12 and 14, respectively, while an upper shaft 22 is mounted for rotation within bearing units 24 and 26 disposed in the upper portion of the walls 12 and 14, respectively, the frame members 12 and 14 being of a rigid strong construction that will withstand the vibration, crushing stresses, and hard use to which such machines are subjected. The shaft 16 may be driven by prime mover (not shown), for example, and is provided with outwardly spaced sheaves 28 and 30, which may be drivingly interconnected with the balance wheels 32 and 34 of the shaft 22 by drive belts. Accordingly, when rotation is imparted to the shaft 16, simultaneous rotation is effected in the upper shaft 22. Since each of the bearing assemblies is substantially identical with the others, only a single one will be explained in detail hereinafter.

The bearing unit 24 includes an inner race 38, an outer race 40, and a plurality of roller bearings 42 disposed therebetween. The inner race 38 of the bearing unit 24 is fitted on the tapered outer wall of a sleeve 44, the inner surface of which snugly engages the outer peripheral surface of the shaft 22. The sleeve 44 is provided with an outwardly or longitudinally extending portion having external threads 46 adapted to receive an internally threaded nut 48. The nut 48 is prevented from easy loosening by a lockwasher 50. The entire bearing unit 24 is further held in place on a shaft 22 by an internally threaded nut 52 adapted to threadingly engage a threaded portion 54 on the exterior wall surface of the shaft 22. Loosening of the nut 52 is minimized by the use of a lockwasher 56. The bearing unit 24 is secured within a suitable aperture formed in a collar 58 which is integral with the frame member 12.

An outer plate 60 and an inner plate 62 are secured to the opposite surfaces of the collar 58 by means of a series of annularly spaced bolts 64. A passageway 66 is formed to extend from the outer surface of the plate 60 to the interior thereof. The outermost end of the passageway is provided with a lubricating line fitting 68 which is coupled to a lubricating line 70, effecting fluid communication with the bearing unit 18 provided on the lower shaft member 16, as will be described and explained in greater detail hereinafter. The interior face of the plate 60 is fashioned in such a manner to provide an annular chamber 72 which is adjacent to one side of the inner race 38, the outer race 40, and the roller bearings 42 of the bearing unit 24. Thus the bearing units 18, 20, 22 and 24 are so constructed as to prevent the escape of fluid lubricant except for the lubricant passing axially therethrough.

Figure 2:
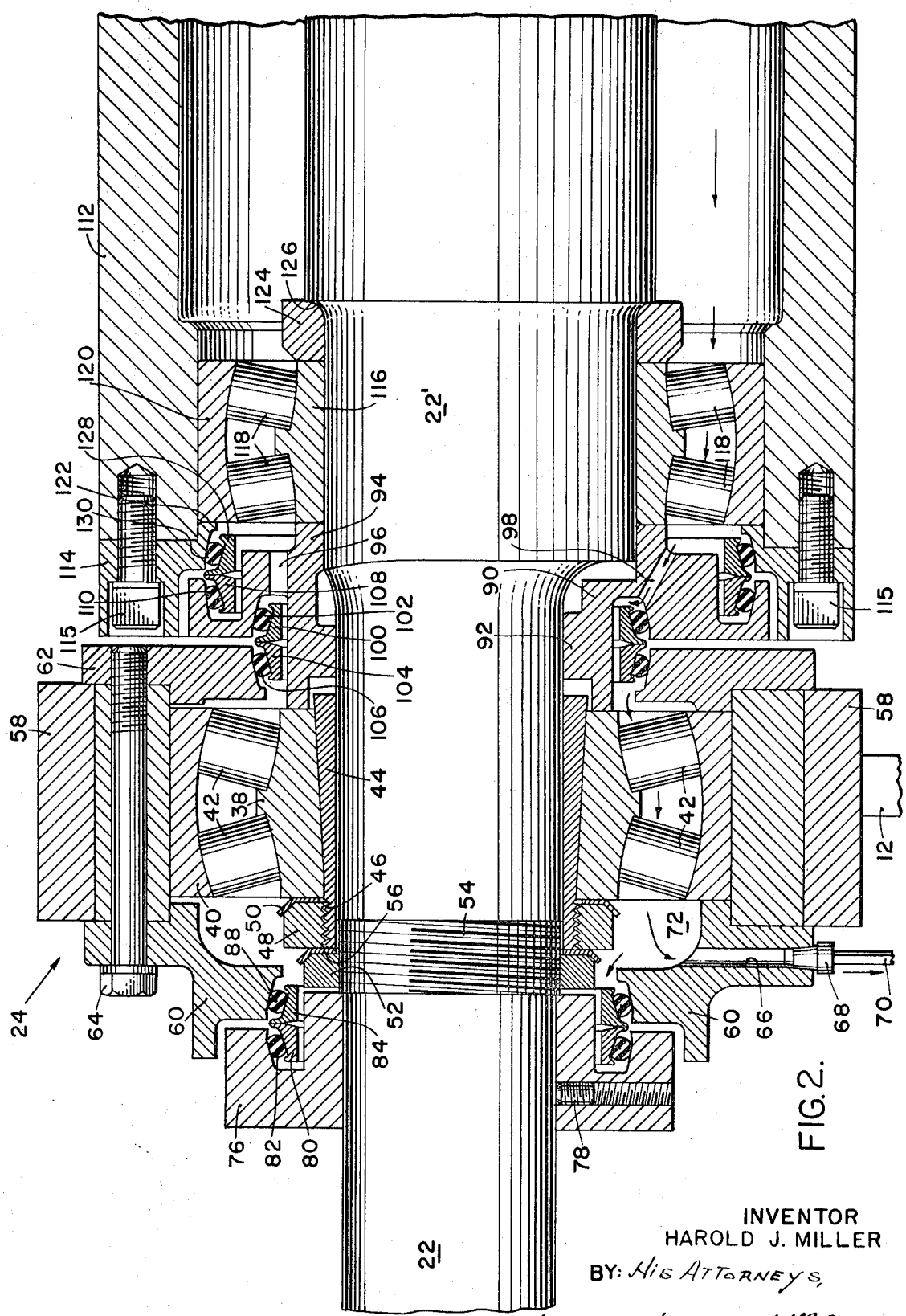
FIG. 2 is an enlarged fragmentary view partly in section showing a pair of serially mounted bearing units illustrated in FIG. 1.

An outer ring member 76 is secured to the shaft 22 by means of a setscrew 78. The ring member 76 is generally J-shaped in cross section, as clearly apparent from an examination of FIG. 2, thus defining an annular chamber which receives a contact sealing ring 80 and a cooperating torus or O-ring 82. The O-ring 82 is formed of an elastomeric material such as rubber, neoprene, or the like which material is generally inert to the lubricating fluid used in the associated system. The relative sizes of the contact sealing ring 80 and the inner wall of the adjacent portion of ring member 76 are such as to maintain the O-ring 82 under compression. A similar contact sealing ring 84 is disposed in adjacent contact with the contact sealing ring 80 and cooperates with a radially inwardly projecting annular shoulder of the outer plate 60 to contain an O-ring 88 under compression. The contact sealing rings 80 and 84, together with their respective O-rings 82 and 88, cooperate to form a fluidtight seal for containing a supply of fluid lubricant on the inside thereof, and militate against the introduction of dirt or other contaminants into the lubricant from the outer environment. It will be observed that, due to the relatively inclined surfaces against which the expanding forces of the compressible O-rings 82 and 88 act, the cooperating respective contact sealing rings 80 and 84 are constantly urged into contact with one another, which effectively contains the fluid lubricant to be circulated within the structure adjacent the inner surfaces of the sealing rings and simultaneously blocks the introduction of dirt from the outer portion of the assembly.

Adjacent to the outer surface of the inner plate 62 there is disposed an annular bearing spacer member 90 having a radially inwardly extending annular shoulder 92 in contact with the outer peripheral surface of the shaft 22, and another annular shoulder 94 in contact with the outer peripheral surface of a portion 22' of the shaft 22 which is eccentrically formed with respect thereto. The annular shoulder 92 is concentric with the centerline of the shaft port 22, while the annular shoulder 94 is concentric with the centerline of the eccentrically formed shaft portion 22. The bearing spaced member 90 is provided with at least one upper port or passageway 96 and one lower port or passageway 98. The passageways 96 and 98 establish fluid communication through the member 90 between the outer and inner surfaces thereof. The outer surface of the spacer member 90 contains one portion of a fluidtight seal which includes a contact sealing ring 100 and a cooperating O-ring 102. The contact sealing ring 100 compressively retains the O-ring 102 against the outer surface of the bearing spacer member 94, as is clearly illustrated in FIG. 2. The radially inwardly extending annular surface of the inner plate 62 contains the other portion of the fluidtight seal, which includes a contact sealing ring 104 and a cooperating O-ring 106. The contact sealing ring 104 compressively retains the O-ring 106 against the inner annular surface of the plate 62.

The opposite surface of the spacer member 90 is provided with a channel for containing one portion of a fluidtight seal which includes a contact sealing ring 108 and a cooperating O-ring 110. The channel containing the contact sealing ring 108 and the O-ring 110 is concentric with the eccentric portion 22' of the shaft 22.

A cylindrical housing 112 is mounted for eccentric circular movement on the shaft portion 22'. An annular retaining ring 114 is fastened to the cylindrical housing 112 by means of a plurality of threaded fasteners 115. A bearing unit comprised of an inner race 116 in engagement with the outer peripheral surface of the shaft 22', a series of roller bearings 118, and an outer race 120, is positively retained on the shaft portion 22' by a radially inwardly extending shoulder 122 of the retainer ring 114 which is in contact with the outer race 120 and the spacer member 90 which is in contact with the inner race 116. Also, the opposite side of the inner race 116 is in contact with a spacer ring 124, which is disposed to surround the shaft portion 22'. The innermost surface of the spacer ring 124 abuts against a shoulder 126 formed on the shaft portion 22'.

In order to effect a fluidtight seal between the spacer member 90 and the retainer ring 114, there is provided a contact sealing ring 128 and a cooperating O-ring 130.

In operation, the lubricating oil to suitably lubricate the various bearing assemblies of the system, as illustrated in FIG. 1, is introduced into the line 132 (FIG. 1) from a pump 134, and thence through the bearing unit 26, through the annular passageway defined by the exterior surface of the shaft portion 22', and the interior of the housing 112, the bearing unit 24, the line 70, the bearing unit 18, through the interior of a housing 112', the bearing unit 20, a line 136, filter assembly 138, and finally recirculated through the system by the pump 134. Since each of the bearing units in the system is substantially identical with one another, specific reference will be made only to the bearing unit 24 specifically illustrated in FIG. 2. As the lubricating fluid is introduced under pressure into the region of the roller bearings 118 from the zone between the outer peripheral wall of the shaft portion 22' and the interior of the housing 112, it is caused to pass around and through the bearings 118 and into the passageways 96 and 98.

It will be appreciated that in the illustrated system, the outer portion of the housing 112 is typically attached to a pitman arm, for example, to which circular oscillatory motion is to be imparted. Accordingly, as the shaft 22 is rotated, the bearing assembly consisting of the inner race 38, the bearings 42, and the outer race 40 provide rotating bearing support for the load of the shaft 22. The inner race 38 will rotate simultaneously with the shaft 22, while the outer race 40 will remain stationary in fixed relation to the collar 58 attached to the frame member 12. A fluidtight seal is adequately maintained on the outer side of the bearing by the cooperation between the relatively movable contact sealing rings 80 and 84. The ring 80 will rotate with the shaft 22 and the ring 84 will remain stationary with respect to the frame 12. A fluidtight seal is adequately maintained on the opposite side of the bearing by cooperation between the contact sealing rings 100 and 104. It will be observed that the contact sealing ring 100 will rotate with the bearing spacer member 90 which rotates with the shaft 22 and the cooperating contact sealing ring 104 remains stationary with respect to the frame 12.

A further fluidtight seal is maintained between the relatively movable spacer member 90 and the retainer ring 114 of the housing 112 by the cooperation between the relatively movable contact sealing rings 108 and 128. The channel of the spacer member 90 which receives the contact sealing ring 108 rotates eccentrically with respect to the shaft 22 and concentrically with respect to the eccentric shaft portion 22'. As the contact sealing ring 108 rotates, it maintains sliding contact with the contact sealing ring 128, which does not rotate, but is caused to move in a circular path of travel about the same axis as the sealing ring 108.

As mentioned hereinabove, the lubricating fluid is caused to pass through the array of bearings 118, and through the passageways 96 and 98 of the bearing spacer member 90, and thence into the array of bearings 42. After passing through the bearings 42, the lubricating fluid enters the annular channel 72 and flows outwardly therefrom through the passageway 66 to the bearing unit 18 through the line 70. The lubricating fluid is maintained within the system by the cooperative action of the contact sealing rings 108, 128; 100, 104; and 80, 88.

The structure described hereinabove provides a system permitting the continuous circulation of lubricating fluids through at least a pair of adjacent eccentrically disposed bearing members. The circulating lubricating fluid bearing under a positive pressure enables the relatively movable cooperating contact sealing rings to retain the fluid and militate against the passage of dirt and other contaminants therethrough in a direction against the fluid pressure.

A further inherent advantage of the system illustrated and described herein is that as the lubricating fluid travels between the bearing units, the heat energy stored therein may be conducted away therefrom, thereby enabling the temperature of the fluid to be maintained below the temperature at which the lubricant loses its lubricating efficiency.

It should be understood, of course, that the use of the term "roller bearings" in the claims comprises cylindrically shaped bearings as well as ball bearings.

In accordance with the provisions of the patent statutes, I have explained the principle and mode of operation of my invention and have illustrated and described what I now consider to represent its best embodiment. However, I desire to have it understood that the invention may be practiced otherwise than as specifically illustrated and described without departing from the spirit or scope.

I claim:

1. An eccentric drive mechanism including: a frame; a bearing unit supported on said frame and sealed to prevent all escape of lubricant except the passage of lubricant axially therethrough; a generally longitudinally disposed shaft having an eccentric portion thereon and also having a journal received by said frame supported bearing unit; means for rotating said shaft; a bearing unit axially spaced from said first-mentioned bearing unit receiving said eccentric portion and oscillating in response to rotation of said eccentric portion; means defining a fluid lubricant passage between said bearing units providing fluid communication therebetween; and means for recirculating the fluid lubricant through said bearing units and said passageway.

2. The mechanism defined in claim 1 wherein said spacer member is affixed to the shaft.

3. The mechanism defined in claim 2 wherein a sealing contact is disposed between one side of said spacer member and a relatively stationary frame, and a second sealing contact is disposed between the other side of said spacer member and a member connected to the bearing unit for the eccentric portion.

4. The mechanism of claim 1 including sealing means associated with said means defining said fluid lubricant passageway radially externally of said passageway for preventing the escape of fluid lubricant.

5. The combination of claim 1 wherein said second-mentioned bearing unit is sealed to prevent all escape of lubricant except for the lubricant passing axially therethrough.

6. An eccentric drive mechanism comprising: a frame; a first pair of spaced-apart roller bearing units supported on said frame, and sealed except to the passage of lubricant axially therethrough; an elongated shaft journaled by said first pair of bearing units and having a central eccentric portion thereon; means for rotating said shaft; a second pair of spaced roller bearing units located axially between said first pair of roller bearing units, receiving said eccentric portion and oscillating in response to rotation of said eccentric portion, said second pair of bearing units being sealed except to the passage of lubricant axially therethrough; a pair of spacer members between the bearing units of said first pair and the axially adjacent bearing units of said second pair; each of said spacer members having a fluid lubricant passageway extending therethrough providing fluid communication between said bearing units of said first and second pair; and a tubular member extending between the bearing units of said second pair providing a peripheral fluid lubricant passageway around said eccentric portion.

7. The invention defined in claim 6 in which means is provided for introducing a lubricant fluid to one of said first pair of bearing units and removing it from the other after it has passed through said second pair of bearing units.

8. An eccentric drive mechanism including: a frame; a roller bearing unit supported on said frame and sealed to prevent all escape of lubricant except the passage of lubricant axially therethrough; a generally longitudinally disposed shaft having an eccentric portion thereon and also having a journal received by said frame-supported bearing unit; means for rotating said shaft; a roller bearing unit, sealed to prevent all escape of lubricant except to the passage of fluid lubricant axially therethrough, axially spaced from said first-mentioned roller bearing unit receiving said eccentric portion and oscillating in response to rotation of said eccentric portion; and a spacer member between said bearing units having a fluid lubricant passageway extending therethrough providing fluid communication between said bearing units.

9. An eccentric drive mechanism comprising: a frame; a first pair of spaced-apart roller bearing units supported on said frame; an elongated shaft journaled by said first pair of bearing units and having a central eccentric portion thereon; means for rotating said shaft; a second pair of spaced roller bearing units located axially between said first pair of roller bearing units, receiving said eccentric portion and oscillating in response to rotation of said eccentric portion; a pair of spacer members between the bearing units of said first pair and the axially adjacent bearing units of said second pair; each of said spacer members having a fluid lubricant passageway extending therethrough providing fluid communication between said bearing units of said first and second pair; a tubular member extending between the bearing units of said second pair providing a peripheral fluid lubricant passageway around said eccentric portion; and means for introducing a lubricant fluid to one of said first pair of bearing units and removing it from the other of said first pair of bearing units after it has passed through said second pair of bearing units.

10. The mechanism defined in claim 9 in which said means includes a recirculating pump.

11. The mechanism defined in claim 10 in which a second elongate shaft is supported by frame-mounted roller bearing units at its outboard ends and has an eccentric central portion journaling a pair of spaced-apart oscillating member roller bearing units; there being seal providing spacer assemblies with passageways between each frame-supported and eccentric portion supported bearing unit; tubular means housing said eccentric portion of the second shaft and furnishing a lubricant passage between said eccentric mounted bearing units; a pipe connecting the bearing unit at one outboard end of one shaft and the bearing unit on an outboard end of the second shaft; said recirculating pump connected to one of the other frame-supported bearing units; and a line leading from the remaining frame-supported bearing unit to said pump.

12. An eccentric drive mechanism comprising: a frame; a first pair of spaced-apart bearing units supported on said frame; an elongated shaft journaled by said first pair of bearing units and having a central eccentric portion thereon; means for rotating said shaft; a second pair of spaced bearing units located axially between said first pair of bearing units, receiving said eccentric portion and oscillating in response to rotation of said eccentric portion; means defining a fluid lubricant passageway extending between the bearing units of said first pair and the axially adjacent bearing units of said second pair providing fluid communication therebetween; a tubular member extending between the bearing units of said second pair providing a peripheral fluid lubricant passageway around said eccentric portion; and means for introducing a lubricant fluid to one of said first pair of bearing units and removing it from the other of said first pair of bearing units after it has passed through said second pair of bearing units.